United States Patent
Archer et al.

(10) Patent No.: US 9,215,138 B2
(45) Date of Patent: Dec. 15, 2015

(54) DETERMINING A SYSTEM CONFIGURATION FOR PERFORMING A COLLECTIVE OPERATION ON A PARALLEL COMPUTER

(71) Applicant: INTERNATIONAL BUSINESS MACHINES CORPORATION, Armonk, NY (US)

(72) Inventors: Charles J. Archer, Rochester, MN (US); James E. Carey, Rochester, MN (US); Philip J. Sanders, Rochester, MN (US); Brian E. Smith, Knoxville, TN (US)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 13/707,098

(22) Filed: Dec. 6, 2012

(65) Prior Publication Data

US 2014/0164592 A1    Jun. 12, 2014

(51) Int. Cl.
*H04L 12/24* (2006.01)
*H04L 12/26* (2006.01)
*G06F 15/173* (2006.01)

(52) U.S. Cl.
CPC .......... *H04L 41/08* (2013.01); *G06F 15/17318* (2013.01); *H04L 41/0803* (2013.01); *H04L 43/0882* (2013.01)

(58) Field of Classification Search
CPC ..... H04L 43/08; H04L 41/08; H04L 41/0803; H04L 43/0882; G06F 17/5009; G06F 15/17318; G05B 13/04; H04W 24/10
See application file for complete search history.

(56) References Cited

U.S. PATENT DOCUMENTS

| | | | |
|---|---|---|---|
| 5,839,120 A * | 11/1998 | Thearling | 706/13 |
| 7,490,029 B2 | 2/2009 | Wasynczuk et al. | |
| 8,769,059 B1 * | 7/2014 | Chheda et al. | 709/220 |
| 8,917,620 B1 * | 12/2014 | Reeves et al. | 370/252 |
| 2006/0101104 A1 * | 5/2006 | Bhanot et al. | 708/105 |

* cited by examiner

*Primary Examiner* — Michael C Lai
(74) *Attorney, Agent, or Firm* — Edward J. Lenart; Grant A. Johnson; Kennedy Lenart Spraggins LLP

(57) ABSTRACT

Determining a system configuration for performing a collective operation on a parallel computer that includes a plurality of compute nodes, the compute nodes coupled for data communications over a data communications network, including: selecting a system configuration on the parallel computer for executing the collective operation; executing the collective operation on the selected system configuration on the parallel computer; determining performance metrics associated with executing the collective operation on the selected system configuration on the parallel computer; selecting, using a simulated annealing algorithm, a plurality of test system configurations on the parallel computer for executing the collective operation, wherein the simulated annealing algorithm specifies a similarity threshold between a plurality of system configurations; executing, the collective operation on each of the test system configurations; and determining performance metrics associated with executing the collective operation on each of the test system configurations.

12 Claims, 8 Drawing Sheets

DETERMINING A SYSTEM CONFIGURATION FOR PERFORMING A COLLECTIVE OPERATION ON A PARALLEL COMPUTER

BACKGROUND OF THE INVENTION

1. Field of the Invention

The field of the invention is data processing, or, more specifically, methods, apparatus, and products for determining a system configuration for performing a collective operation on a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Modern computing systems can include a parallel computer with thousands of compute nodes coupled to each other for data communications. Such parallel computers can run millions of processes simultaneously. In view of the large number of compute nodes in a parallel computer, the various manners in which the compute nodes can be coupled, and the number of processes that may be executing on each node, there exists a large number of available configurations for executing a particular operation.

SUMMARY OF THE INVENTION

Methods, apparatus, and products for determining a system configuration for performing a collective operation on a parallel computer, the parallel computer comprising a plurality of compute nodes, the compute nodes coupled for data communications over a data communications network, including: selecting, by a performance measurement module, a system configuration on the parallel computer for executing the collective operation; executing, by the performance measurement module, the collective operation on the selected system configuration on the parallel computer; determining, by the performance measurement module, performance metrics associated with executing the collective operation on the selected system configuration on the parallel computer; selecting, by the performance measurement module using a simulated annealing algorithm, a plurality of test system configurations on the parallel computer for executing the collective operation, wherein the simulated annealing algorithm specifies a similarity threshold between a plurality of system configurations; executing, by the performance measurement module, the collective operation on each of the test system configurations; and determining, by the performance measurement module, performance metrics associated with executing the collective operation on each of the test system configurations.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
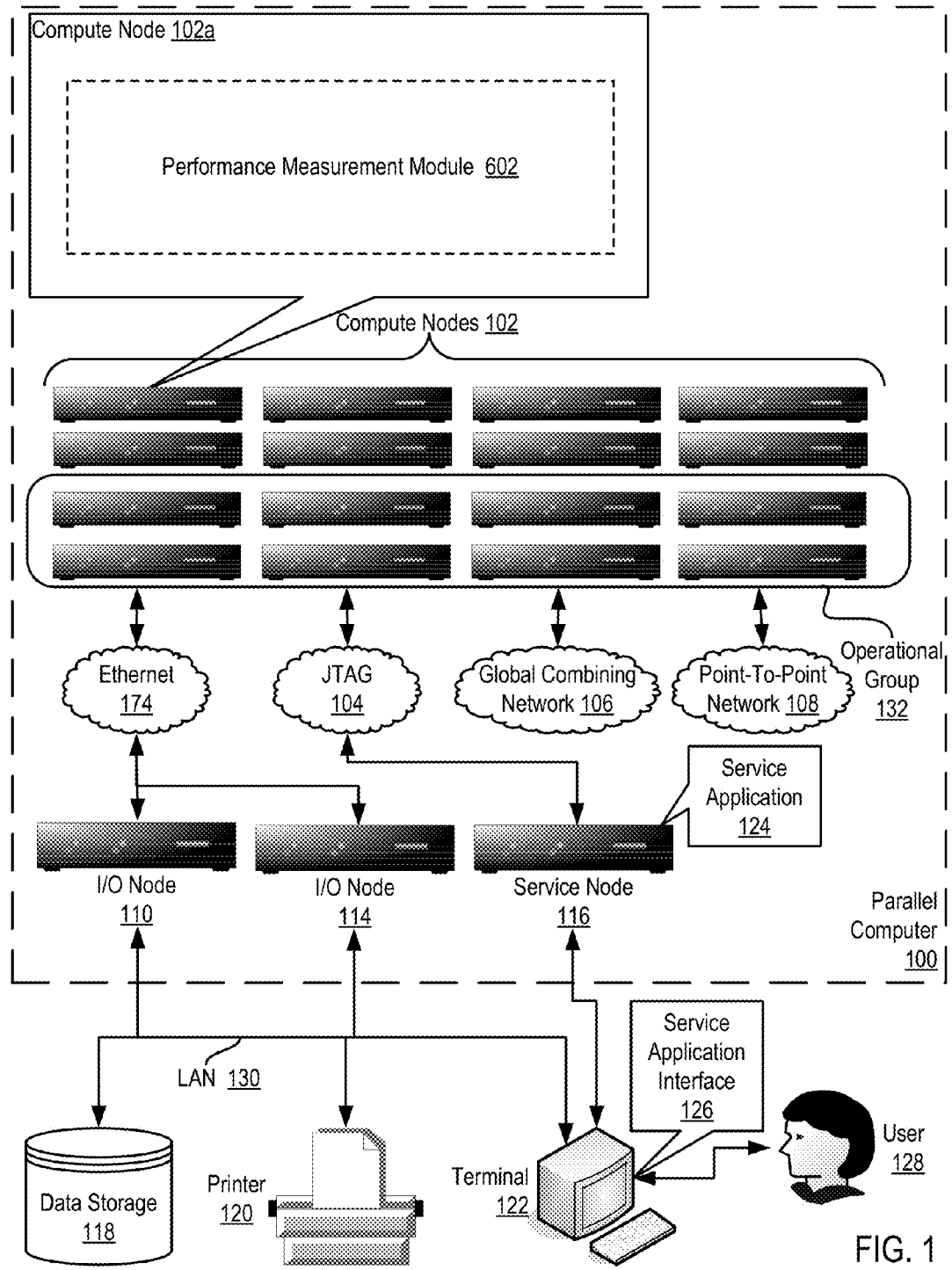
FIG. 1 sets forth example apparatus for determining a system configuration for performing a collective operation on a parallel computer according to embodiments of the present invention.

Example methods, apparatus, and products for determining a system configuration for performing a collective operation on a parallel computer in accordance with the present invention are described with reference to the accompanying drawings, beginning with FIG. 1. FIG. 1 illustrates an example system for determining a system configuration for performing a collective operation on a parallel computer according to embodiments of the present invention. The system of FIG. 1 includes a parallel computer (100), non-volatile memory for the computer in the form of a data storage device (118), an output device for the computer in the form of a printer (120), and an input/output device for the computer in the form of a computer terminal (122).

The parallel computer (100) in the example of FIG. 1 includes a plurality of compute nodes (102). The compute nodes (102) are coupled for data communications by several independent data communications networks including a high speed Ethernet network (174), a Joint Test Action Group ('JTAG') network (104), a global combining network (106) which is optimized for collective operations using a binary tree network topology, and a point-to-point network (108), which is optimized for point-to-point operations using a torus network topology. The global combining network (106) is a data communications network that includes data communications links connected to the compute nodes (102) so as to organize the compute nodes (102) as a binary tree. Each data communications network is implemented with data communications links among the compute nodes (102). The data communications links provide data communications for parallel operations among the compute nodes (102) of the parallel computer (100).

The compute nodes (102) of the parallel computer (100) are organized into at least one operational group (132) of compute nodes for collective parallel operations on the parallel computer (100). Each operational group (132) of compute nodes is the set of compute nodes upon which a collective parallel operation executes. Each compute node in the operational group (132) is assigned a unique rank that identifies the particular compute node in the operational group (132). Collective operations are implemented with data communications among the compute nodes of an operational group. Collective operations are those functions that involve all the compute nodes of an operational group (132). A collective operation is an operation, a message-passing computer program instruction that is executed simultaneously, that is, at approximately the same time, by all the compute nodes in an operational group (132) of compute nodes. Such an operational group (132) may include all the compute nodes (102) in a parallel computer (100) or a subset all the compute nodes (102). Collective operations are often built around point-to-point operations. A collective operation requires that all processes on all compute nodes within an operational group (132) call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group (132). An operational group (132) may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use in systems configured according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group (132). For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. In a scatter operation, the logical root divides data on the root into segments and distributes a different segment to each compute node in the operational group (132). In scatter operation, all processes typically specify the same receive count. The send arguments are only significant to the root process, whose buffer actually contains sendcount*N elements of a given datatype, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduction operation is also a many-to-one collective operation that includes an arithmetic or logical function performed on two data elements. All processes specify the same 'count' and the same arithmetic or logical function. After the reduction, all processes have sent count data elements from compute node send buffers to the root process. In a reduction operation, data elements from corresponding send buffer locations are combined pair-wise by arithmetic or logical operations to yield a single corresponding element in the receive buffer of a root process. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes (102) in the parallel computer (100) may be partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer (102). For example, in some configurations, each processing set may be composed of eight compute nodes and one I/O node. In some other configurations, each processing set may be composed of sixty-four compute nodes and one I/O node. Such example are for explanation only, however, and not for limitation. Each I/O node provides I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the compute nodes, and so on. Service node (116) runs a service application (124) and communicates with users (128) through a service application interface (126) that runs on computer terminal (122).

The parallel computer (100) of FIG. 1 operates generally for determining a system configuration for performing a collective operation on the parallel computer (100). Such a parallel computer (100) is typically composed of many compute nodes, but for ease of explanation one of the compute nodes (102a) in this example are referenced in particular. The compute node (102a) includes a performance measurement module (602) for determining a system configuration for performing a collective operation on the parallel computer (100). The performance measurement module (602) of FIG. 1 may be embodied as a module of computer program instructions executing on computer hardware. The performance measurement module (602) of FIG. 1 can determine a system configuration for performing a collective operation on the parallel computer (100) by: selecting a system configuration on the parallel computer for executing the collective operation, executing the collective operation on the selected system configuration on the parallel computer, determining performance metrics associated with executing the collective operation on the selected system configuration on the parallel computer, selecting, using a simulated annealing algorithm, a plurality of test system configurations on the parallel computer for executing the collective operation, executing the collective operation on each of the test system configurations, and determining performance metrics associated with executing the collective operation on each of the test system configurations. Although the performance measurement module (602) is depicted as residing on compute node (102a), readers will appreciate that the performance measurement module (602) may reside on one or more of the compute nodes (102) in the parallel computer, including any of the I/O nodes (110, 114) or the service node (116).

The arrangement of nodes, networks, and I/O devices making up the example apparatus illustrated in FIG. 1 are for explanation only, not for limitation of the present invention. Systems configured for determining a system configuration for performing a collective operation on a parallel computer according to embodiments of the present invention may include additional nodes, networks, devices, and architectures, not shown in FIG. 1, as will occur to those of skill in the art. The parallel computer (100) in the example of FIG. 1 includes sixteen compute nodes (102); parallel computers configured for determining a system configuration for performing a collective operation on a parallel computer according to embodiments of the present invention sometimes include thousands of compute nodes. In addition to Ethernet (174) and JTAG (104), networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Determining a system configuration for performing a collective operation on a parallel computer according to embodiments of the present invention is generally implemented on a parallel computer that includes a plurality of compute nodes organized for collective operations through at least one data communications network. In fact, such computers may include thousands of such compute nodes. Each compute node is in turn itself a kind of computer composed of one or more computer processing cores, its own computer memory, and its own input/output adapters. For further explanation, therefore, FIG. 2 sets forth a block diagram of an example compute node (102) useful in a parallel computer capable of determining a system configuration for performing a collective operation according to embodiments of the present invention. The compute node (102) of FIG. 2 includes a plurality of processing cores (165) as well as RAM (156). The processing cores (165) of FIG. 2 may be configured on one or more integrated circuit dies. Processing cores (165) are connected to RAM (156) through a high-speed memory bus (155) and through a bus adapter (194) and an extension bus (168) to other components of the compute node. Stored in RAM (156) is an application program (159), a module of computer program instructions that carries out parallel, user-level data processing using parallel algorithms.

Also stored RAM (156) is a parallel communications library (161), a library of computer program instructions that carry out parallel communications among compute nodes, including point-to-point operations as well as collective operations. A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the MPI library and the 'Parallel Virtual Machine' ('PVM') library.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (102) of FIG. 2, another factor that decreases the demands on the operating system. The operating system (162) may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Windows XP™, AIX™, IBM's i5/OS™, and others as will occur to those of skill in the art.

Also stored in RAM (156) is a performance measurement module (602) for determining a system configuration for performing a collective operation on the parallel computer (100). The performance measurement module (602) of FIG. 2 includes computer program instructions that, when executed, can determine a system configuration for performing a collective operation on the parallel computer by: selecting a system configuration on the parallel computer for executing the collective operation, executing the collective operation on the selected system configuration on the parallel computer, determining performance metrics associated with executing the collective operation on the selected system configuration on the parallel computer, selecting, using a simulated annealing algorithm, a plurality of test system configurations on the parallel computer for executing the collective operation, executing the collective operation on each of the test system configurations, and determining performance metrics associated with executing the collective operation on each of the test system configurations.

Figure 2:
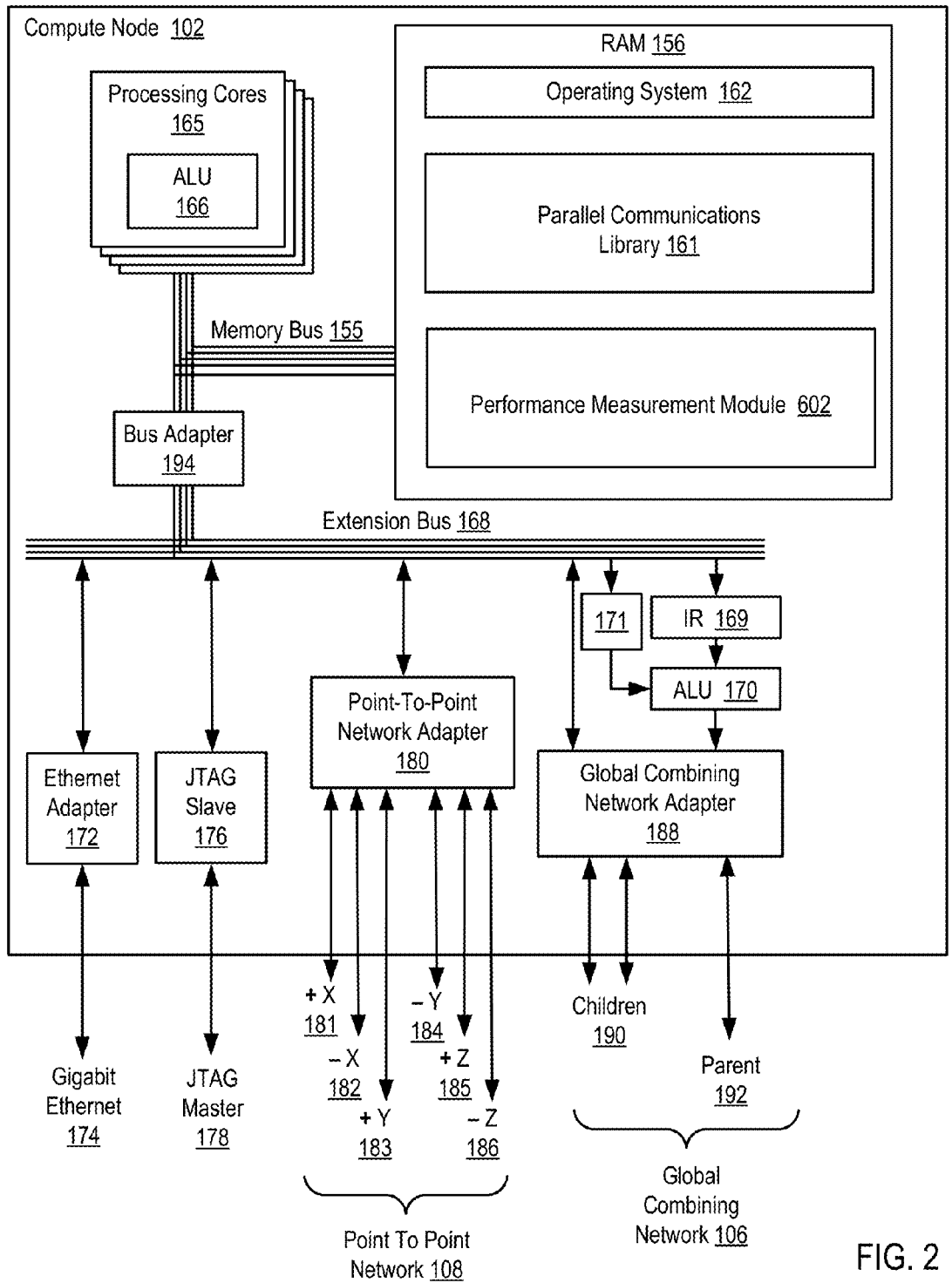
FIG. 2 sets forth a block diagram of an example compute node useful in a parallel computer capable of determining a system configuration for performing a collective operation according to embodiments of the present invention.

The example compute node (102) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in apparatus useful for determining a system configuration for performing a collective operation on a parallel computer include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (102) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit (176) that couples example compute node (102) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient alternative access point into the system. The example compute node of FIG. 2 may be all three of these: It typically includes one or more integrated circuits installed on a printed circuit board and may be implemented as an embedded system having its own processing core, its own memory, and its own I/O capability. JTAG boundary scans through JTAG Slave (176) may efficiently configure processing core registers and memory in compute node (102) for use in dynamically reassigning a connected node to a block of compute nodes useful in systems for determining a system configuration for performing a collective operation on a parallel computer according to embodiments of the present invention.

The data communications adapters in the example of FIG. 2 include a Point-To-Point Network Adapter (180) that couples example compute node (102) for data communications to a network (108) for point-to-point message passing operations such as, for example, a network configured as a three-dimensional torus or mesh. The Point-To-Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 include a Global Combining Network Adapter (188) that couples example compute node (102) for data communications to a global combining network (106) for collective message passing operations such as, for example, a network configured as a binary tree. The Global Combining Network Adapter (188) provides data communications through three bidirectional links for each global combining network (106) that the Global Combining Network Adapter (188) supports. In the example of FIG. 2, the Global Combining Network Adapter (188) provides data communications through three bidirectional links for global combining network (106): two to children nodes (190) and one to a parent node (192).

The example compute node (102) includes multiple arithmetic logic units ('ALUs'). Each processing core (165) includes an ALU (166), and a separate ALU (170) is dedicated to the exclusive use of the Global Combining Network Adapter (188) for use in performing the arithmetic and logical functions of reduction operations, including an allreduce operation. Computer program instructions of a reduction routine in a parallel communications library (161) may latch an instruction for an arithmetic or logical function into an instruction register (169). When the arithmetic or logical function of a reduction operation is a 'sum' or a 'logical OR,' for example, the collective operations adapter (188) may execute the arithmetic or logical operation by use of the ALU (166) in the processing core (165) or, typically much faster, by use of the dedicated ALU (170) using data provided by the nodes (190, 192) on the global combining network (106) and data provided by processing cores (165) on the compute node (102).

Often when performing arithmetic operations in the global combining network adapter (188), however, the global combining network adapter (188) only serves to combine data received from the children nodes (190) and pass the result up the network (106) to the parent node (192). Similarly, the global combining network adapter (188) may only serve to transmit data received from the parent node (192) and pass the data down the network (106) to the children nodes (190). That is, none of the processing cores (165) on the compute node (102) contribute data that alters the output of ALU (170), which is then passed up or down the global combining network (106). Because the ALU (170) typically does not output any data onto the network (106) until the ALU (170) receives input from one of the processing cores (165), a processing core (165) may inject the identity element into the dedicated ALU (170) for the particular arithmetic operation being perform in the ALU (170) in order to prevent alteration of the output of the ALU (170). Injecting the identity element into the ALU, however, often consumes numerous processing cycles. To further enhance performance in such cases, the example compute node (102) includes dedicated hardware (171) for injecting identity elements into the ALU (170) to reduce the amount of processing core resources required to prevent alteration of the ALU output. The dedicated hardware (171) injects an identity element that corresponds to the particular arithmetic operation performed by the ALU. For example, when the global combining network adapter (188) performs a bitwise OR on the data received from the children nodes (190), dedicated hardware (171) may inject zeros into the ALU (170) to improve performance throughout the global combining network (106).

Figure 3A:
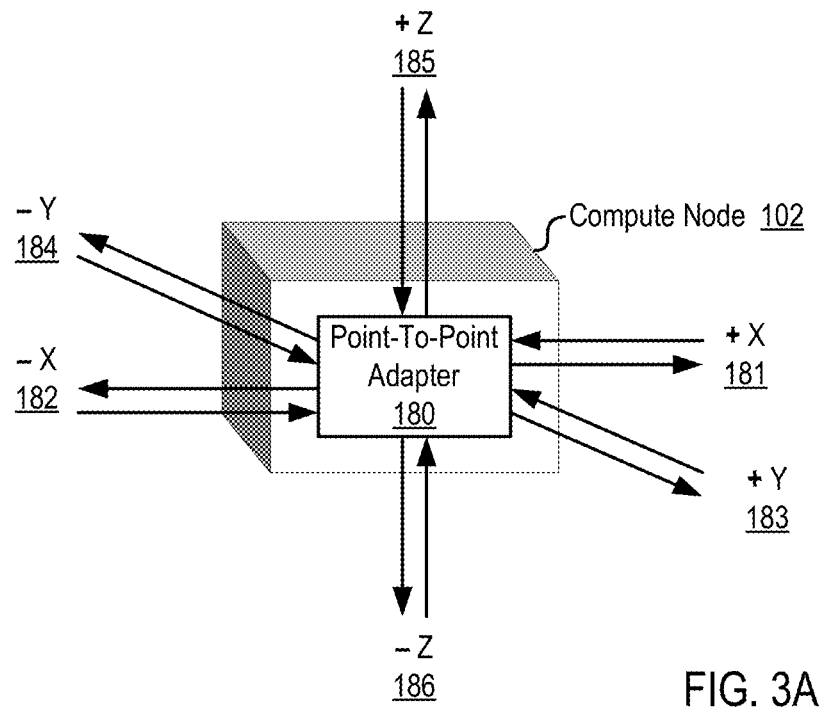
FIG. 3A sets forth a block diagram of an example Point-To-Point Adapter useful in systems for determining a system configuration for performing a collective operation on a parallel computer according to embodiments of the present invention.

For further explanation, FIG. 3A sets forth a block diagram of an example Point-To-Point Adapter (180) useful in systems for determining a system configuration for performing a collective operation on a parallel computer according to embodiments of the present invention. The Point-To-Point Adapter (180) is designed for use in a data communications network optimized for point-to-point operations, a network that organizes compute nodes in a three-dimensional torus or mesh. The Point-To-Point Adapter (180) in the example of FIG. 3A provides data communication along an x-axis through four unidirectional data communications links, to and from the next node in the −x direction (182) and to and from the next node in the +x direction (181). The Point-To-Point Adapter (180) of FIG. 3A also provides data communication along a y-axis through four unidirectional data communications links, to and from the next node in the −y direction (184) and to and from the next node in the +y direction (183). The Point-To-Point Adapter (180) of FIG. 3A also provides data communication along a z-axis through four unidirectional data communications links, to and from the next node in the −z direction (186) and to and from the next node in the +z direction (185).

Figure 3B:
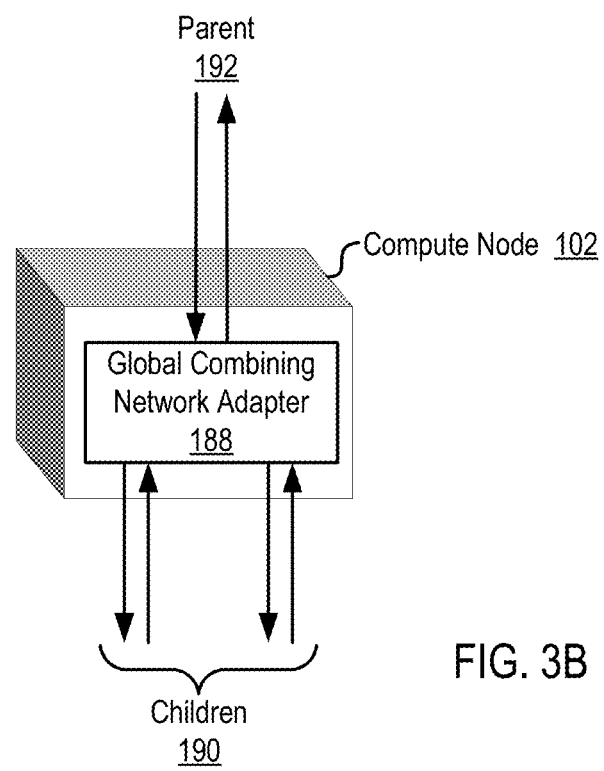
FIG. 3B sets forth a block diagram of an example Global Combining Network Adapter useful in systems for determining a system configuration for performing a collective operation on a parallel computer according to embodiments of the present invention.

For further explanation, FIG. 3B sets forth a block diagram of an example Global Combining Network Adapter (188) useful in systems for determining a system configuration for performing a collective operation on a parallel computer according to embodiments of the present invention. The Global Combining Network Adapter (188) is designed for use in a network optimized for collective operations, a network that organizes compute nodes of a parallel computer in a binary tree. The Global Combining Network Adapter (188) in the example of FIG. 3B provides data communication to and from children nodes of a global combining network through four unidirectional data communications links (190), and also provides data communication to and from a parent node of the global combining network through two unidirectional data communications links (192).

Figure 4:
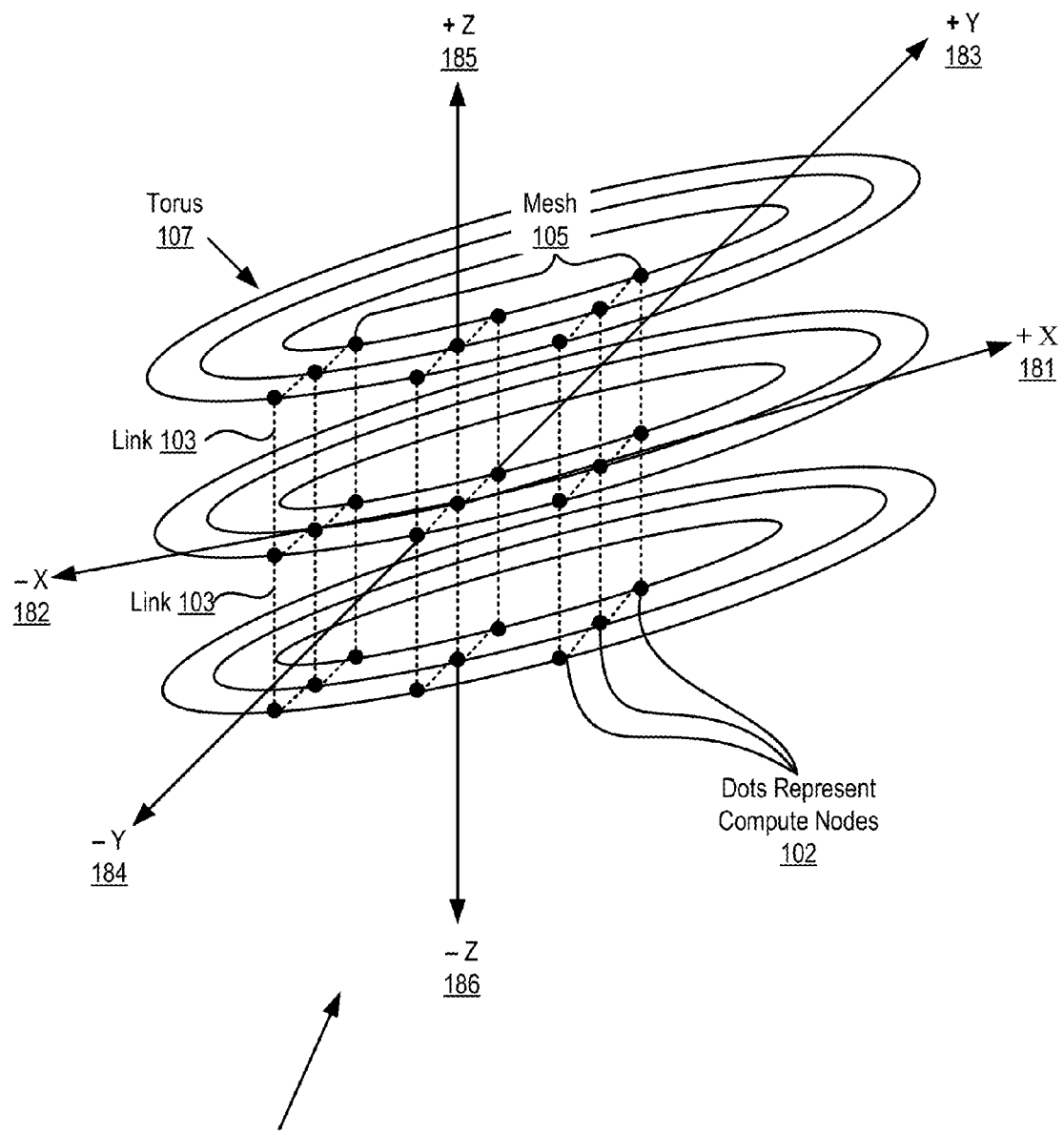
FIG. 4 sets forth a line drawing illustrating an example data communications network optimized for point-to-point operations useful in systems capable of determining a system configuration for performing a collective operation on a parallel computer according to embodiments of the present invention.

For further explanation, FIG. 4 sets forth a line drawing illustrating an example data communications network (108) optimized for point-to-point operations useful in systems capable of determining a system configuration for performing a collective operation on a parallel computer according to embodiments of the present invention. In the example of FIG. 4, dots represent compute nodes (102) of a parallel computer, and the dotted lines between the dots represent data communications links (103) between compute nodes. The data communications links are implemented with point-to-point data communications adapters similar to the one illustrated for example in FIG. 3A, with data communications links on three axis, x, y, and z, and to and for in six directions +x (181), −x (182), +y (183), −y (184), +z (185), and −z (186). The links and compute nodes are organized by this data communications network optimized for point-to-point operations into a three dimensional mesh (105). The mesh (105) has wrap-around links on each axis that connect the outermost compute nodes in the mesh (105) on opposite sides of the mesh (105). These wrap-around links form a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point-to-point operations for use in determining a system configuration for performing a collective operation on a parallel computer in accordance with embodiments of the present invention may contain only a few compute nodes or may contain thousands of compute nodes. For ease of explanation, the data communications network of FIG. 4 is illustrated with only three dimensions, but readers will recognize that a data communications network optimized for point-to-point operations for use in determining a system configuration for performing a collective operation on a parallel computer in accordance with embodiments of the present invention may in fact be implemented in two dimensions, four dimensions, five dimensions, and so on. Several supercomputers now use five dimensional mesh or torus networks, including, for example, IBM's Blue Gene Q™.

Figure 5:
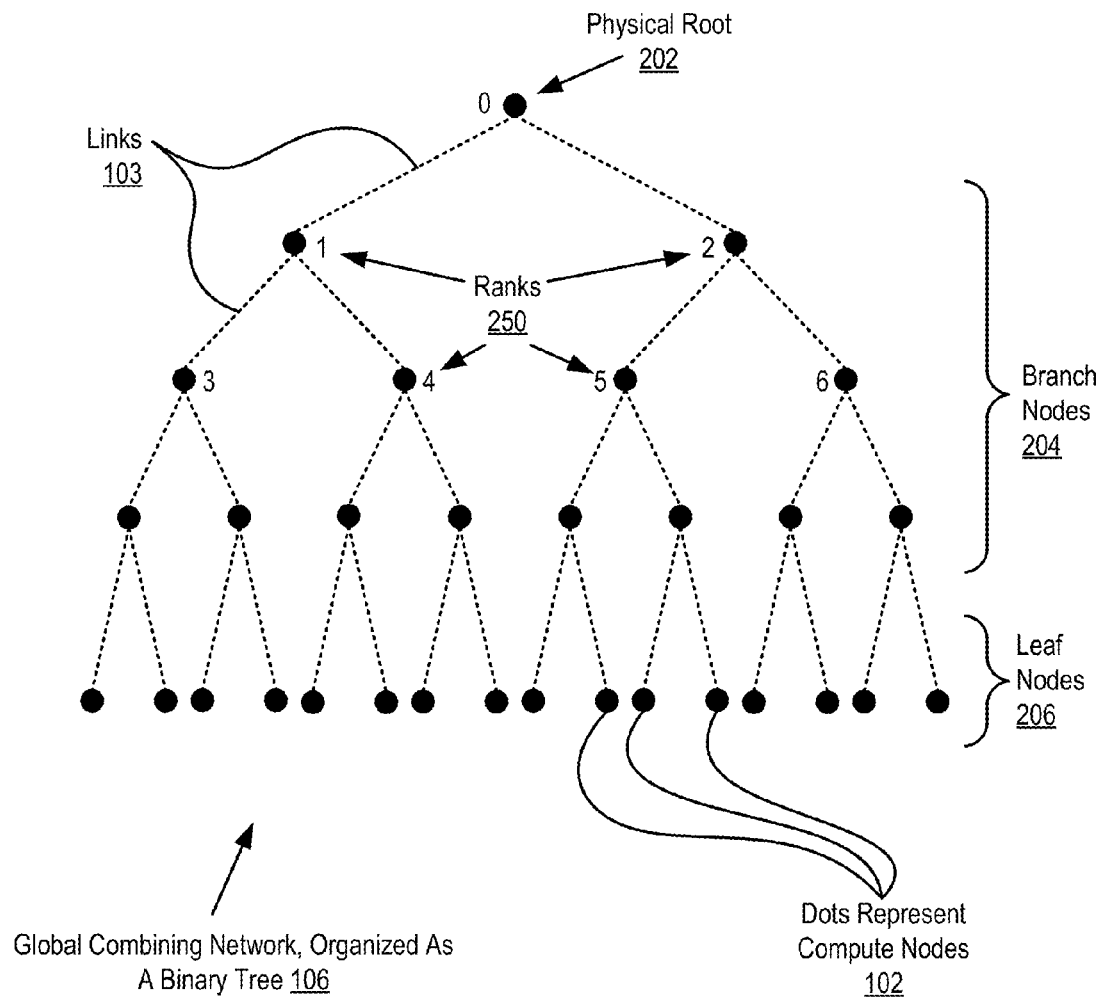
FIG. 5 sets forth a line drawing illustrating an example global combining network useful in systems capable of determining a system configuration for performing a collective operation on a parallel computer according to embodiments of the present invention.

For further explanation, FIG. 5 sets forth a line drawing illustrating an example global combining network (106) useful in systems capable of determining a system configuration for performing a collective operation on a parallel computer according to embodiments of the present invention. The example data communications network of FIG. 5 includes data communications links (103) connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in the global combining network (106) may be characterized as a physical root node (202), branch nodes (204), and leaf nodes (206). The physical root (202) has two children but no parent and is so called because the physical root node (202) is the node physically configured at the top of the binary tree. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a global combining network (106) optimized for collective operations for use in determining a system configuration for performing a collective operation on a parallel computer in accordance with embodiments of the present invention may contain only a few compute nodes or may contain thousands of compute nodes.

In the example of FIG. 5, each node in the tree is assigned a unit identifier referred to as a 'rank' (250). The rank actually identifies a task or process that is executing a parallel operation. Using the rank to identify a node assumes that only one such task is executing on each node. To the extent that more than one participating task executes on a single node, the rank identifies the task as such rather than the node. A rank uniquely identifies a task's location in the tree network for use in both point-to-point and collective operations in the tree network. The ranks in this example are assigned as integers beginning with 0 assigned to the root tasks or root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
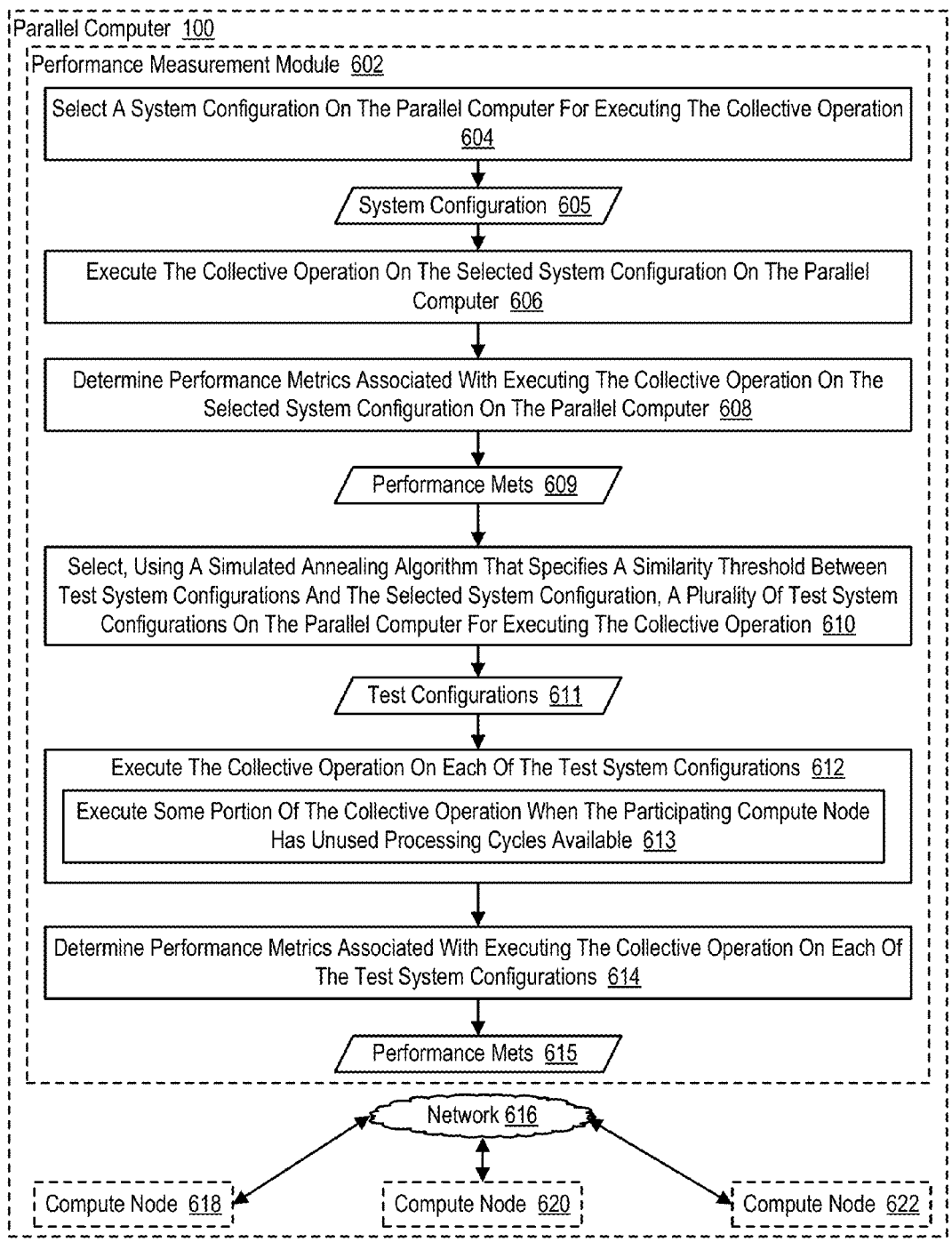
FIG. 6 sets forth a flow chart illustrating an example method for determining a system configuration for performing a collective operation on a parallel computer according to embodiments of the present invention.

For further explanation, FIG. 6 sets forth a flow chart illustrating an example method for determining a system configuration for performing a collective operation on a parallel computer (100) according to embodiments of the present invention. In the example of FIG. 6, the parallel computer (100) includes a plurality of compute nodes (618, 620, 622) coupled for data communications over a data communications network (616), as described above with reference to FIGS. 1-5. The parallel computer (100) of FIG. 6 also includes a performance measurement module (602). The performance measurement module (602) of FIG. 6 may be embodied, for example, as a module of computer program instructions executing on computer hardware.

The method of FIG. 6 includes selecting (604), by the performance measurement module (602), a system configuration (605) on the parallel computer (100) for executing the collective operation. In the example method of FIG. 6, the system configuration (605) identifies the resources within the parallel computer (100) that will be used to execute the collective operation, as well as various configurable attributes associated with the resources within the parallel computer (100) that will be used to execute the collective operation. The system configuration (605) of FIG. 6 can identify, for example, which compute nodes (618, 620, 622) in the parallel computer (100) will participate in the execution of the collective operation, a geometry of participating compute nodes (618, 620, 622) that identifies the relative arrangement of nodes into, for example, a tree structure, a torus, and so on. The system configuration (605) of FIG. 6 can also identify which data communications network (616) will be used to communicate messages between the participating compute nodes, the size of each message that will be sent between the participating compute nodes, and so on. Readers will appreciate that in a parallel computer (100) as described above, there may be many available system configurations as the parallel computer (100) may include a large number of compute nodes that may participate in executing the collective operation, each of which may be included in a number of networking topologies and may be configured to support messages of many sizes. In the example method of FIG. 6, the system configuration (605) on the parallel computer (100) for executing the collective operation may be selected (604) randomly, using the last system configuration used when executing the collective operation, in response to a user selection, in response to a system administrator's best guess as to a preferred configuration, and so on.

The method of FIG. 6 also includes executing (606), by the performance measurement module (602), the collective operation on the selected system configuration (605) on the parallel computer (100). In the example method of FIG. 6, executing (606) the collective operation on the selected system configuration (605) on the parallel computer (100) may be carried out by creating an operational group as described above that includes the participating compute nodes specified in the selected system configuration (605). Nodes in such an operational group may be configured to communicate using the data communications networks specified in the selected system configuration (605) and may be further configured to communicate using messages of a size specified in the selected system configuration (605). In such an example, executing (606) the collective operation on the selected system configuration (605) on the parallel computer (100) may therefore be carried out by initiating execution of the collective operation using the newly created operational group.

The method of FIG. 6 also includes determining (608), by the performance measurement module (602), performance metrics (609) associated with executing the collective operation on the selected system configuration (605) on the parallel computer (100). In the example method of FIG. 6, performance metrics (609) associated with executing the collective operation on the selected system configuration (605) may include information identifying, for example, the amount of network bandwidth utilized to complete execution of the collective operation, the amount of time required to complete execution of the collective operation, the number of processing cycles for processors on each participating compute node needed to complete execution of the collective operation, and so on. In such an example, the performance metrics (609) associated with executing the collective operation on the selected system configuration (605) represents a measure of how efficiently the collective operation executed on the selected system configuration (605).

The method of FIG. 6 also includes selecting (610), by the performance measurement module (602) using a simulated annealing algorithm, a plurality of test system configurations (611) on the parallel computer (100) for executing the collective operation. In the example method of FIG. 6, each of the test system configurations (611) identifies the resources within the parallel computer (100) that will be used to execute the collective operation, as well as various configurable attributes associated with the resources within the parallel computer (100) that will be used to execute the collective operation. The test system configurations (611) can include much of the types of information as the selected system configuration (605), but with different parameters such that each of the test system configurations (611) represents a unique system configuration that is different than the selected system configuration (605).

The plurality of test system configurations (611) may be selected (610) using a simulated annealing algorithm. The simulated annealing algorithm of FIG. 6 is a generic probabilistic metaheuristic for the global optimization problem of locating a good approximation to the global optimum of a given function in a large search space. A simulated annealing algorithm may be utilized when a search space is discrete and may be more efficient that exhaustive enumeration, especially when the goal is to find an acceptably good solution in a fixed amount of time rather than the best possible solution. In the example method of FIG. 6, the test space can be quite large as there is a discrete, yet large set of available system configurations that involve different sets of participating compute nodes, different message sizes, and the like.

Consider an example in which a parallel computer (100) included three compute nodes (618, 620, 622) available for participation in a collective operation. Assume that each compute node (618, 620, 622) can support a message size of 1 KB, 2 KB, and 4 KB. In such an example, there are seven possible combinations of participating nodes: 1) all compute nodes (618, 620, 622), 2) compute node (618) and compute node (620), 3) compute node (618) and compute node (622), 4) compute node (620) and compute node (622), 5) compute node (618), 6) compute node (620), and 7) compute node (622). When taking into account that each potential combination of participating compute nodes can operate using three different message sizes, there are twenty-one possible system configurations that identify the participating compute nodes and the message size to be used for messages sent between participating nodes. In such an example, if the selected system configuration (605) identifies compute node (618) and compute node (622) as the participating nodes and further specifies a message size of 1 KB, the set of system configurations that differ from the selected system configuration (605) can include the other twenty system configurations. The simulated annealing algorithm may therefore select (610), randomly or according to a set of predefined rules, any of the twenty system configurations that differ from the selected system configuration (605) as test system configurations (611).

In the example method of FIG. 6, the simulated annealing algorithm specifies a similarity threshold a plurality of system configurations. In the example method of FIG. 6, the simulated annealing algorithm can specify a similarity threshold between the test system configurations (611) and the selected system configuration (605). In the example method of FIG. 6, similarity threshold between the test system configurations (611) and the selected system configuration (605) may identify the extent to which one or more parameters in the test system configurations (611) and the selected system configuration (605) are similar. For example, a similarity threshold may specify that the message size in the test system configurations (611) and the selected system configuration (605) may only vary by one hundred percent. In the example described above where the selected system configuration (605) specifies a message size of 1 KB, a similarity threshold where the message size in the test system configurations (611) and the selected system configuration (605) could only vary by one hundred percent would have the effect of eliminating all system configurations in which the message size is 4 KB from consideration as test system configurations (611) as the variance in message size between such configurations and the selected system configuration (605) exceeds the similarity threshold. Readers will appreciate that larger similarity thresholds between the test system configurations (611) and the selected system configuration (605) will have the effect of expanding the candidate set of system configurations that may qualify to be test system configurations (611), while smaller similarity thresholds between the test system configurations (611) and the selected system configuration (605) will have the effect of reducing the candidate set of system configurations that may qualify to be test system configurations (611).

The method of FIG. 6 also includes executing (612), by the performance measurement module (602), the collective operation on each of the test system configurations (611). In the example method of FIG. 6, executing (612) the collective operation on each of the test system configurations (611) may be carried out by creating, for each test system configuration (611), an operational groups as described above that includes the participating compute nodes specified in the test system configuration (611). Nodes in such an operational group may be configured to communicate using the data communications networks specified in the test system configuration (611) and may be further configured to communicate using messages of a size specified in the test system configuration (611). In such an example, executing (612) the collective operation on each of the test system configurations (611) on the parallel computer (100) may therefore be carried out by initiating execution of the collective operation using each newly created operational group.

In the example method of FIG. 6, executing (612) the collective operation on each of the test system configurations (611) can include executing (613) some portion of the collective operation when the participating compute node has unused processing cycles available. By executing (613) some portion of the collective operation when the participating compute node has unused processing cycles available, each participating compute node can carry out its normal processing operations and only execute testing operations when unused processing cycles are available, such that executing a collective operation on a test system configuration (611) does not interfere with the processing operations carried out by a compute node that is part of the test system configuration (611).

The method of FIG. 6 also includes determining (614), by the performance measurement module (602), performance metrics (615) associated with executing the collective operation on each of the test system configurations (611). In the example method of FIG. 6, performance metrics (615) associated with executing the collective operation on each of the test system configurations (611) may include information identifying, for example, the amount of network bandwidth utilized to complete execution of the collective operation, the amount of time required to complete execution of the collective operation, the number of processing cycles for processors on each participating compute node needed to complete execution of the collective operation, and so on. In such an example, the performance metrics (615) associated with executing the collective operation on each of the test system configurations (611) represents a measure of how efficiently the collective operation executed on the each test system configuration (611).

Figure 7:
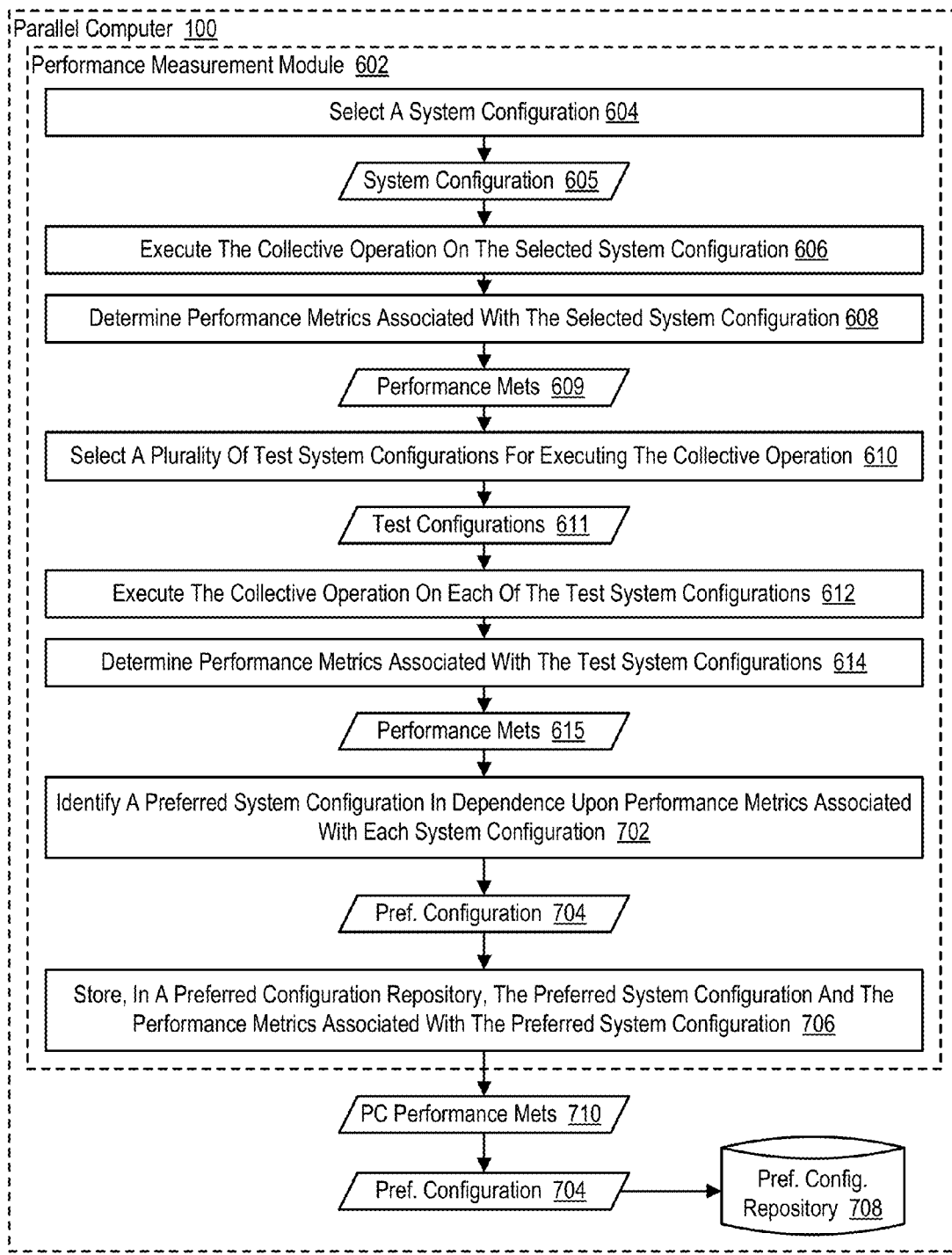
FIG. 7 sets forth a flow chart illustrating a further example method for determining a system configuration for performing a collective operation on a parallel computer according to embodiments of the present invention.

For further explanation, FIG. 7 sets forth a flow chart illustrating a further example method for determining a system configuration for performing a collective operation on a parallel computer (100) according to embodiments of the present invention. The example method of FIG. 7 is similar to the example method of FIG. 6, as it also includes selecting (604) a system configuration (605) on the parallel computer (100) for executing the collective operation, executing (606) the collective operation on the selected system configuration (605) on the parallel computer (100), determining (608) performance metrics (609) associated with executing the collective operation on the selected system configuration (605) on the parallel computer (100), selecting (610) a plurality of test system configurations (611) on the parallel computer (100) for executing the collective operation using a simulated annealing algorithm, executing (612) the collective operation on each of the test system configurations (611), and determining (614) performance metrics (615) associated with executing the collective operation on each of the test system configurations (611). Although not illustrated in FIG. 7, the method of FIG. 7 is carried out on a parallel computer (100) that includes a plurality of compute nodes coupled for data communications over a data communications network, as described above with reference to FIGS. 1-5.

The example method of FIG. 7 also includes identifying (702), by the performance measurement module (602), a preferred system configuration (704) in dependence upon performance metrics (609, 615) associated with each system configuration (605, 611). In the example method of FIG. 7, the preferred system configuration (704) represents the system configuration upon which the collective operation performs best with respect to one or more relevant performance indicators. For example, a system administrator may determine that the only relevant performance indicator is execution time, such that the system configuration (605, 611) whose performance metrics (609, 615) include the shortest execution time may be identified (702) as the preferred system configuration (704). Alternatively, a system administrator may determine that the only relevant performance indicator is network bandwidth, such that the system configuration (605, 611) whose performance metrics (609, 615) include the lowest amount of network traffic generated while executing the collective operation may be identified (702) as the preferred system configuration (704). Readers will appreciate that additional relevant performance indicators may be utilized to identify (702) a preferred system configuration (704) and that a combination of relevant performance indicators may be utilized to identify (702) a preferred system configuration (704). In such an example, the performance metrics (609, 615) associated with each system configuration (605, 611) may be examined to identify how well each configuration performed with respect to the relevant performance indicators. In such a way, the system configuration (605, 611) whose performance metrics (609, 615) indicate the best performance in executing the collective operation may be identified (702) as the preferred system configuration (704).

The example method of FIG. 7 also includes storing (706), by the performance measurement module (602) in a preferred configuration repository (708), the preferred system configuration (704) and the performance metrics (710) associated with the preferred system configuration (704). In the example method of FIG. 7, the preferred configuration repository (708) may be embodied, for example, as a data structure that includes information identify preferred system configurations for executing one of more collective operations. Each entry in the preferred configuration repository (708) may include information such as an identifier for a collective operation, an identifier for a system configuration, information identifying the participating compute nodes in the system configuration, a message size to be used in the preferred configuration, a network topology for connecting the participating nodes, various performance metrics associated with executing the collective operation on the preferred configuration, and so on. Table 1 illustrates one possible embodiment of the preferred configuration repository (708):

TABLE 1

Preferred Configuration Repository

| Collective ID | Config. ID | Nodes Participating | Message Size | Network Topology | Execution Time | Messages Exchanged |
|---|---|---|---|---|---|---|
| AllGather1 | 1 | 1, 2, 3, 4 | 1 KB | Torus | 186 mS | 43 |
| AllGather2 | 2 | 1, 2, 5, 8 | 1 KB | Torus | 44 mS | 22 |
| AllGather3 | 11 | 2, 3, 7 | 8 KB | Tree | 18 mS | 11 |
| AllReduce1 | 27 | 2, 6, 19, 44 | 2 KB | Torus | 111 mS | 57 |
| AllReduce2 | 4 | 9, 11, 14, 19 | 2 KB | Tree | 68 mS | 26 |
| AllReduce3 | 6 | 3, 8, 11 | 4 KB | Torus | 267 mS | 103 |
| AllReduce4 | 9 | 1, 2, 4, 8, 16 | 1 KB | Tree | 158 mS | 47 |

In the example illustrated in Table 1, each entry includes an identifier of the collective operation to be executed, an identifier of the preferred system configuration to be used when executing the collective operation, an identification of the compute nodes that are included in the preferred system configuration, the size of messages to be exchanged by the participating compute nodes when executing the collective operation, a network topology indicating how the participating nodes are arranged for data communications, the amount of time required to execute the collective operation on the preferred system configuration, and the number of messages exchanged between the participating compute nodes when executing the collective operation. Readers will appreciate that this is one possible example of a preferred configuration repository (708) and in no way represents a limitation of the format that a preferred configuration repository (708) can take, the information that can be included in the preferred configuration repository (708), or any other limitation as to the possible embodiments of the preferred configuration repository (708). In the example method of FIG. 7, storing (706) the preferred system configuration (704) and the performance metrics (710) associated with the preferred system configuration (704) in a preferred configuration repository (708) may therefore be carried out, for example, by adding an entry to the preferred configuration repository (708) and populating all fields in the preferred configuration repository (708) using the performance metrics (710) associated with the preferred system configuration (704).

Figure 8:
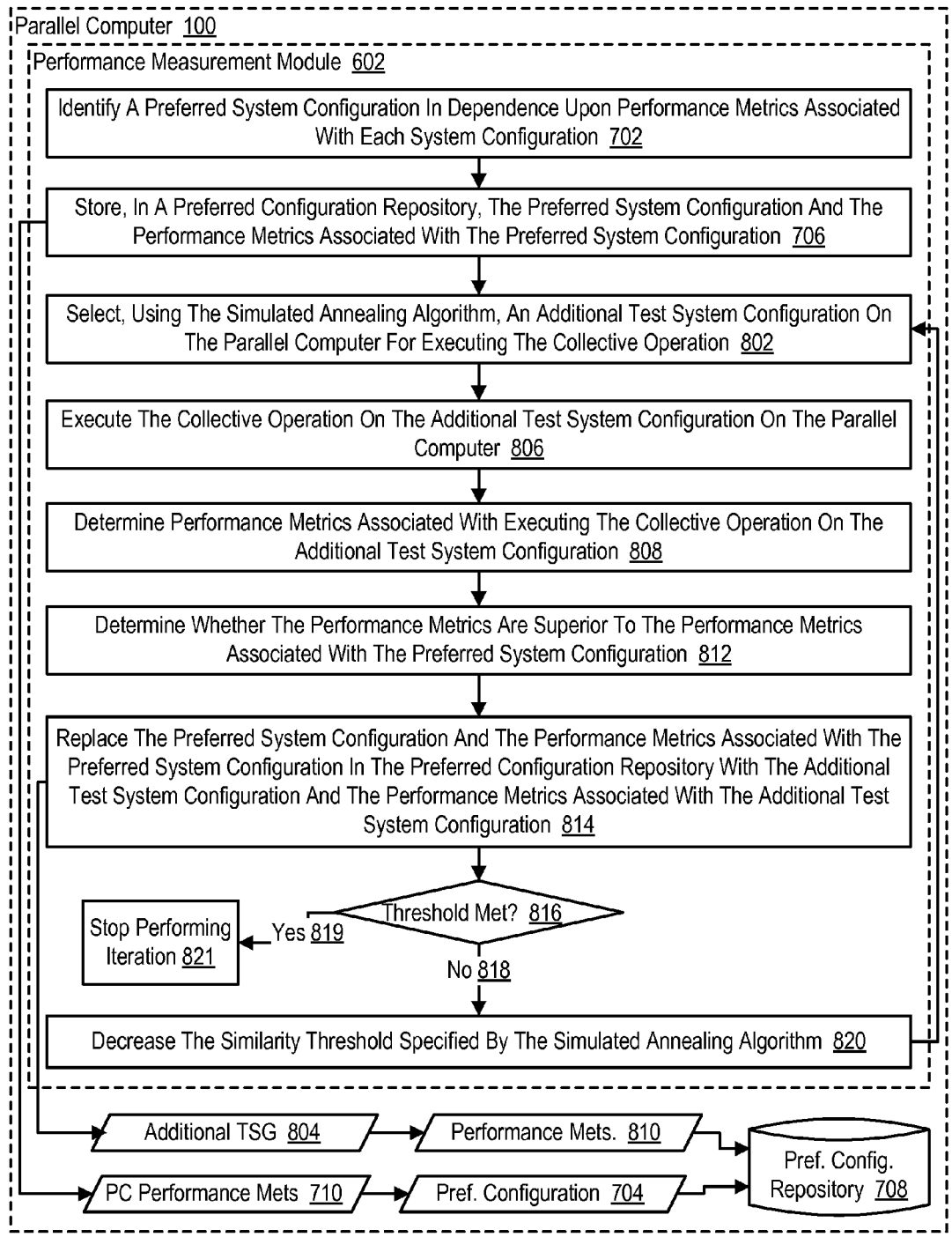
FIG. 8 sets forth a flow chart illustrating a further example method for determining a system configuration for performing a collective operation on a parallel computer according to embodiments of the present invention.

For further explanation, FIG. 8 sets forth a flow chart illustrating a further example method for determining a system configuration for performing a collective operation on a parallel computer (100) according to embodiments of the present invention. Although not illustrated in FIG. 8, the example method of FIG. 8 is similar to the example method of FIG. 7 as it also includes selecting (604 in FIG. 7) a system configuration (605 in FIG. 7) for executing the collective operation, executing (606 in FIG. 7) the collective operation on the selected system configuration (605 in FIG. 7), determining (608 in FIG. 7) performance metrics (609 in FIG. 7) associated with executing the collective operation on the selected system configuration (605 in FIG. 7), selecting (610 in FIG. 7) a plurality of test system configurations (611 in FIG. 7) for executing the collective operation using a simulated annealing algorithm, executing (612 in FIG. 7) the collective operation on each of the test system configurations (611 in FIG. 7), and determining (614 in FIG. 7) performance metrics (615) associated with executing the collective operation on each of the test system configurations (611). The example of FIG. 8 also includes identifying (702) a preferred system configuration (704) in dependence upon performance metrics (609, 615) associated with each system configuration (605, 611), and storing (706), in a preferred configuration repository (708), the preferred system configuration (704) and the performance metrics (710) associated with the preferred system configuration (704). Although not illustrated in FIG. 8, the method of FIG. 8 is carried out on a parallel computer (100) that includes a plurality of compute nodes coupled for data communications over a data communications network, as described above with reference to FIGS. 1-5.

The method of FIG. 8 also includes selecting (802), by the performance measurement module (602) using the simulated annealing algorithm, an additional test system configuration (804) on the parallel computer (100) for executing the collective operation. In the example method of FIG. 8, the additional test system configuration (804) identifies the resources within the parallel computer (100) that will be used to execute the collective operation, as well as various configurable attributes associated with the resources within the parallel computer (100) that will be used to execute the collective operation. The additional test system configuration (804) of FIG. 8 can identify, for example, which compute nodes in the parallel computer (100) will participate in the execution of the collective operation, which data communications network will be used to communicate messages between the participating compute nodes, the size of each message that will be sent between the participating compute nodes, and so on. Readers will appreciate that in a parallel computer (100) as described above, there may be many available system configurations as the parallel computer (100) may include a large number of compute nodes that may participate in executing the collective operation, each of which may be included in a number of networking topologies and may be configured to support messages of many sizes. The additional test system configuration (804) of FIG. 8 represents a different system configuration that the preferred system configuration (704).

In the example method of FIG. 8, the additional test system configuration (804) for executing the collective operation may be selected (802) using the simulated annealing algorithm. As described above, the simulated annealing algorithm specifies a similarity threshold between system configurations. In the example method of FIG. 8, the simulated annealing algorithm can specify a similarity threshold between the test system configurations (611) and the selected system configuration (605).

The method of FIG. 8 also includes executing (806), by the performance measurement module (602), the collective operation on the additional test system configuration (804) on the parallel computer (100). In the example method of FIG. 8, executing (806) the collective operation on the additional test system configuration (804) may be carried out by creating an operational group as described above that includes the participating compute nodes specified in the additional test system configuration (804). Nodes in such an operational group may be configured to communicate using the data communications networks specified in the additional test system configuration (804) and may be further configured to communicate using messages of a size specified in the additional test system configuration (804). In such an example, executing (806) the collective operation on the additional test system configuration (804) may therefore be carried out by initiating execution of the collective operation using the newly created operational group.

The method of FIG. 8 also includes determining (808), by the performance measurement module (602), performance metrics (810) associated with executing the collective operation on the additional test system configuration (804). In the example method of FIG. 8, performance metrics (810) associated with executing the collective operation on the additional test system configuration (804) may include information identifying, for example, the amount of network bandwidth utilized to complete execution of the collective operation, the amount of time required to complete execution of the collective operation, the number of processing cycles for processors on each participating compute node needed to complete execution of the collective operation, and so on. In such an example, the performance metrics (810) associated with executing the collective operation on the additional test system configuration (804) represents a measure of how efficiently the collective operation executed on the additional test system configuration (804).

The method of FIG. 8 also includes determining (812), by the performance measurement module (602), whether the performance metrics (810) associated with the additional test system configuration (804) are superior to the performance metrics (710) associated with the preferred system configuration (704). In the example method of FIG. 8, determining (812) whether the performance metrics (810) associated with the additional test system configuration (804) are superior to the performance metrics (710) associated with the preferred system configuration (704) may be carried out, for example, by comparing values in the performance metrics (810) associated with the additional test system configuration (804) to values in the performance metrics (710) associated with the preferred system configuration (704). For example, a system administrator may determine that the only relevant performance indicator is execution time, such that the system configuration (704, 804) whose performance metrics (710, 810) include the shortest execution time may be identified as the preferred system configuration. Alternatively, a system administrator may determine that the only relevant performance indicator is network bandwidth, such that the system configuration (704, 804) whose performance metrics (710, 810) include the lowest amount of network traffic generated while executing the collective operation may be identified as the preferred system configuration.

Readers will appreciate that additional relevant performance indicators may be utilized to identify a preferred system configuration and that a combination of relevant performance indicators may be utilized to identify a preferred system configuration. In such an example, by determining (812) whether the performance metrics (810) associated with the additional test system configuration (804) are superior to the performance metrics (710) associated with the preferred system configuration (704), it can be determined whether the additional test system configuration (804) represents an improvement over the preferred system configuration (704). If the additional test system configuration (804) represents an improvement over the preferred system configuration (704), the additional test system configuration (804) may replace the preferred system configuration (704) as the system configuration to be utilized when executing the collective operation.

The method of FIG. 8 also includes replacing (814) the preferred system configuration (704) and the performance metrics (710) associated with the preferred system configuration (704) in the preferred configuration repository (708) with the additional test system configuration (804) and the performance metrics (810) associated with the additional test system configuration (804). In the example method of FIG. 8, replacing (814) the preferred system configuration (704) and the performance metrics (710) associated with the preferred system configuration (704) in the preferred configuration repository (708) with the additional test system configuration (804) and the performance metrics (810) associated with the additional test system configuration (804) is carried out in response to determining that the performance metrics (810) associated with the additional test system configuration (804) are superior to the performance metrics (710) associated with the preferred system configuration (704). In the example method of FIG. 8, replacing (814) the preferred system configuration (704) and the performance metrics (710) associated with the preferred system configuration (704) in the preferred configuration repository (708) with the additional test system configuration (804) and the performance metrics (810) associated with the additional test system configuration (804) may be carried out, for example, by updating the entry in the preferred configuration repository (708) that includes the preferred system configuration (704) and the performance metrics (710) with information identifying the additional test system configuration (804) and the performance metrics (810) associated with the additional test system configuration (804).

Consider the preferred configuration repository (708) described above in Table 1. In such an example, the preferred configuration for the collective operation identified as 'AllGather1' is the configuration identified by configuration ID '1.' Assume, in such an example, that additional test system configuration (804) identified by configuration ID '44' is tested and completes execution of AllGather1 in less time and using less bandwidth than is required when AllGather1 is executed on the configuration identified by configuration ID '1.' In such an example, the performance metrics (810) associated with such an additional test system configuration (804) would be determined (812) to be superior to the performance metrics (710) associated with the preferred system configuration (704). As such, the preferred system configuration (704) and the performance metrics (710) associated with the preferred system configuration (704) would be replaced (814) in the preferred configuration repository (708) with the additional test system configuration (804) and the performance metrics (810) associated with the additional test system configuration (804). Table 2 represents such an updated preferred configuration repository (708):

TABLE 2

Preferred Configuration Repository

| Collective ID | Config. ID | Nodes Participating | Message Size | Network Topology | Execution Time | Messages Exchanged |
|---|---|---|---|---|---|---|
| AllGather1 | 44 | 3, 11, 22, 81 | 2 KB | Torus | 152 mS | 33 |
| AllGather2 | 2 | 1, 2, 5, 8 | 1 KB | Torus | 44 mS | 22 |
| AllGather3 | 11 | 2, 3, 7 | 8 KB | Tree | 18 mS | 11 |
| AllReduce1 | 27 | 2, 6, 19, 44 | 2 KB | Torus | 111 mS | 57 |
| AllReduce2 | 4 | 9, 11, 14, 19 | 2 KB | Tree | 68 mS | 26 |
| AllReduce3 | 6 | 3, 8, 11 | 4 KB | Torus | 267 mS | 103 |
| AllReduce4 | 9 | 1, 2, 4, 8, 16 | 1 KB | Tree | 158 mS | 47 |

In the example method of FIG. 8, steps 802, 806, 808, 812, and 814 are carried out iteratively until a predetermined threshold is met. In the example method of FIG. 8 the predetermined threshold may be embodied, for example, as a predetermined amount of time such that steps 802, 806, 808, 812, and 814 are repeated for a limited amount of time. Alternatively, the predetermined threshold may be embodied as a percentage of performance improvement such that steps 802, 806, 808, 812, and 814 are repeated so long as at least one additional test system configuration (804) that is tested during a single iteration of steps 802, 806, 808, 812, and 814 represents an improvement over the preferred system configuration (704) by a predetermined percentage of performance improvement. In such a way, the steps 802, 806, 808, 812, and 814 will continue to be repeated so long as carrying out steps 802, 806, 808, 812, and 814 results in identifying a system configuration that represents an improvement over all other system configurations that have been tested. The example method of FIG. 8 therefore includes determining (816) whether the threshold has been met. If the threshold is not (818) met, steps 802, 806, 808, 812, and 814 are repeated.

The example method of FIG. 8 also includes decreasing (820), by the performance measurement module (602), the similarity threshold specified by the simulated annealing algorithm. As described above, the simulated annealing algorithm specifies a similarity threshold a plurality of system configurations. As the similarity threshold specified by the simulated annealing algorithm is large, the number of possible system configurations that are similar to a particular reference configuration are very large. As the similarity threshold specified by the simulated annealing algorithm gets smaller, the number of possible system configurations that are similar to the particular reference configuration also decreases. By decreasing (820) the similarity threshold specified by the simulated annealing algorithm, each iteration of steps 802, 806, 808, 812, and 814 can therefore become more focused as a smaller portion of the search space of all possible system configurations may be subject to testing.

Example embodiments of the present invention are described largely in the context of a fully functional computer system for determining a system configuration for performing a collective operation on a parallel computer. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus for determining a system configuration for performing a collective operation on a parallel computer, the parallel computer comprising a plurality of compute nodes, the compute nodes coupled for data communications over a data communications network, the apparatus comprising a computer processor and a computer memory operatively coupled to the computer processor, the computer memory including computer program instructions that, when executed by the computer processor, cause the apparatus to carry out the steps of:

selecting from a plurality of system configurations, by a performance measurement module, a system configuration on the parallel computer for executing the collective operation;

executing, by the performance measurement module, the collective operation on the selected system configuration on the parallel computer;

determining, by the performance measurement module, performance metrics associated with executing the collective operation on the selected system configuration on the parallel computer;

selecting, by the performance measurement module using a simulated annealing algorithm, a plurality of test system configurations on the parallel computer for executing the collective operation, wherein the simulated annealing algorithm specifies a similarity threshold between the plurality of test system configurations and the selected system configuration;

executing, by the performance measurement module, the collective operation on each of the test system configurations; and determining, by the performance measurement module, performance metrics associated with executing the collective operation on each of the test system configurations.

2. The apparatus of claim 1 further comprising computer program instructions that, when executed by the computer processor, cause the apparatus to carry out the step of identifying, by the performance measurement module, a preferred system configuration in dependence upon performance metrics associated with each system configuration of the plurality of system configurations.

3. The apparatus of claim 2 further comprising computer program instructions that, when executed by the computer processor, cause the apparatus to carry out the step of storing, by the performance measurement module in a preferred configuration repository, the preferred system configuration and the performance metrics associated with the preferred system configuration.

4. The apparatus of claim 3 further comprising computer program instructions that, when executed by the computer processor, cause the apparatus to carry out the steps of, iteratively for a predetermined period of time performing selecting, by the performance measurement module using the simulated annealing algorithm, an additional test system configuration on the parallel computer for executing the collective operation;

executing, by the performance measurement module, the collective operation on the additional test system configuration on the parallel computer;

determining, by the performance measurement module, performance metrics associated with executing the collective operation on the additional test system configuration;

determining, by the performance measurement module, whether the performance metrics associated with the additional test system configuration are superior to the performance metrics associated with the preferred system configuration; and responsive to determining that the performance metrics associated with the additional test system configuration are superior to the performance metrics associated with the preferred system configuration, replacing the preferred system configuration and the performance metrics associated with the preferred system configuration in the preferred configuration repository with the additional test system configuration and the performance metrics associated with the additional test system configuration.

5. The apparatus of claim 1 wherein each system configuration of the plurality of system configurations includes a geometry of participating compute nodes and a message size for messages exchanged between the participating compute nodes.

6. The apparatus of claim 1 wherein executing the collective operation on each test system configuration on the parallel computer further comprises executing, by a participating compute node, some portion of the collective operation when the participating compute node has unused processing cycles available.

7. A computer program product for determining a system configuration for performing a collective operation on a parallel computer, the parallel computer comprising a plurality of compute nodes, the compute nodes coupled for data communications over a data communications network, the computer program product including a computer readable storage medium, wherein the computer readable storage medium is not a signal, the computer readable medium including computer program instructions that, when executed, cause a computer to carry out the steps of:

selecting from a plurality of system configurations, by a performance measurement module, a system configuration on the parallel computer for executing the collective operation;

executing, by the performance measurement module, the collective operation on the selected system configuration on the parallel computer;

determining, by the performance measurement module, performance metrics associated with executing the collective operation on the selected system configuration on the parallel computer;

selecting, by the performance measurement module using a simulated annealing algorithm, a plurality of test system configurations on the parallel computer for executing the collective operation, wherein the simulated annealing algorithm specifies a similarity threshold between the plurality of test system configurations and the selected system configuration;

executing, by the performance measurement module, the collective operation on each of the test system configurations; and determining, by the performance measurement module, performance metrics associated with executing the collective operation on each of the test system configurations.

8. The computer program product of claim 7 further comprising computer program instructions that, when executed, cause the computer to carry out the step of identifying, by the performance measurement module, a preferred system configuration in dependence upon performance metrics associated with each system configuration of the plurality of system configurations.

9. The computer program product of claim 8 further comprising computer program instructions that, when executed, cause the computer to carry out the step of storing, by the performance measurement module in a preferred configuration repository, the preferred system configuration and the performance metrics associated with the preferred system configuration.

10. The computer program product of claim 9 further comprising computer program instructions that, when executed, cause the computer to carry out the steps of, iteratively for a predetermined period of time performing selecting, by the performance measurement module using the simulated annealing algorithm, an additional test system configuration on the parallel computer for executing the collective operation;

executing, by the performance measurement module, the collective operation on the additional test system configuration on the parallel computer;

determining, by the performance measurement module, performance metrics associated with executing the collective operation on the additional test system configuration;

determining, by the performance measurement module, whether the performance metrics associated with the additional test system configuration are superior to the performance metrics associated with the preferred system configuration; and responsive to determining that the performance metrics associated with the additional test system configuration are superior to the performance metrics associated with the preferred system configuration, replacing the preferred system configuration and the performance metrics associated with the preferred system configuration in the preferred configuration repository with the additional test system configuration and the performance metrics associated with the additional test system configuration.

11. The computer program product of claim 7 wherein each system configuration of the plurality of system configurations includes a geometry of participating compute nodes and a message size for messages exchanged between the participating compute nodes.

12. The computer program product of claim 7 wherein executing the collective operation on each test system configuration on the parallel computer further comprises executing, by a participating compute node, some portion of the collective operation when the participating compute node has unused processing cycles available.

* * * * *